US012792168B2

(12) United States Patent
Chida

(10) Patent No.: US 12,792,168 B2
(45) Date of Patent: Nov. 10, 2026

(54) DISTANCE MEASURING DEVICE AND DISTANCE MEASURING METHOD

(71) Applicant: NIKON VISION CO., LTD., Tokyo (JP)

(72) Inventor: Kazuki Chida, Yokohama (JP)

(73) Assignee: NIKON VISION CO., LTD., Tokyo (JP)

(*) Notice: Subject to any disclaimer, the term of this patent is extended or adjusted under 35 U.S.C. 154(b) by 587 days.

(21) Appl. No.: 18/274,797

(22) PCT Filed: Jan. 29, 2021

(86) PCT No.: PCT/JP2021/003432
§ 371 (c)(1),
(2) Date: Jul. 28, 2023

(87) PCT Pub. No.: WO2022/162922
PCT Pub. Date: Aug. 4, 2022

(65) Prior Publication Data

US 2024/0118418 A1 Apr. 11, 2024

(51) Int. Cl.
*G06F 3/041* (2006.01)
*G01S 17/08* (2006.01)
(Continued)

(52) U.S. Cl.
CPC ............ *G06F 3/0412* (2013.01); *G01S 17/08* (2013.01); *G06F 3/0488* (2013.01); *G06T 7/13* (2017.01); *G06T 11/60* (2013.01); *G06V 10/764* (2022.01)

(58) Field of Classification Search
CPC ........... G06T 7/66; G06T 7/246; G03B 15/16; H04N 23/675; H04N 23/635;
(Continued)

(56) References Cited

U.S. PATENT DOCUMENTS

| | | | | |
|---|---|---|---|---|
| 11,893,749 | B1 * | 2/2024 | Yang | G06T 7/50 |
| 2016/0103209 | A1 * | 4/2016 | Masuda | G03B 17/56 348/135 |

(Continued)

FOREIGN PATENT DOCUMENTS

| | | | |
|---|---|---|---|
| JP | H11-88870 | A | 3/1999 |
| JP | 2001-124544 | A | 5/2001 |

(Continued)

OTHER PUBLICATIONS

Nov. 12, 2024 Office Actions issued in Japanese Patent Application No. 2022-577994.

(Continued)

*Primary Examiner* — Kenneth J Malkowski
(74) *Attorney, Agent, or Firm* — Oliff PLC

(57) ABSTRACT

A distance measurement apparatus including: a control unit that controls a projection state of light based on a detection result of a target object; a light projection unit that projects light controlled by the control unit onto the target object; and a processing unit that determines a distance to the target object based on a detection result of reflected light. With this, it is possible to accurately project the light onto the target object and determine the distance to the target object by: controlling the projection state of the light based on the detection result of the target object to project the light onto the target object; and determining the distance to the target object based on the detection result of the reflected light.

18 Claims, 17 Drawing Sheets

(51) Int. Cl.

| | |
|---|---|
| ***G06F 3/0488*** | (2022.01) |
| ***G06T 7/13*** | (2017.01) |
| ***G06T 11/60*** | (2006.01) |
| ***G06V 10/764*** | (2022.01) |

(58) Field of Classification Search

CPC .......... H04N 23/695; G01C 3/08; G01C 3/04; G01C 3/00; G01B 11/026

See application file for complete search history.

(56) References Cited

U.S. PATENT DOCUMENTS

| | | | |
|---|---|---|---|
| 2017/0234974 | A1 | 8/2017 | Mochizuki |
| 2018/0165815 | A1* | 6/2018 | Okada ........................ G06T 7/20 |
| 2020/0402249 | A1* | 12/2020 | Kim ........................ G01S 17/86 |

FOREIGN PATENT DOCUMENTS

| | | | |
|---|---|---|---|
| JP | 2001-304855 | A | 10/2001 |
| JP | 2005-156356 | A | 6/2005 |
| JP | 2009-192415 | A | 8/2009 |
| JP | 2012-186538 | A | 9/2012 |
| JP | 2017-201281 | A | 11/2017 |
| JP | 2018-096709 | A | 6/2018 |
| JP | 2019-174229 | A | 10/2019 |
| WO | 2012/066741 | A1 | 5/2012 |
| WO | 2015/008587 | A1 | 1/2015 |
| WO | 2016/030925 | A1 | 3/2016 |
| WO | 2017/057362 | A1 | 4/2017 |
| WO | 2017/159312 | A1 | 9/2017 |
| WO | 2017/208437 | A1 | 12/2017 |

OTHER PUBLICATIONS

Feb. 27, 2024 Office Action issued in Japanese Patent Application No. 2022-577994.

Apr. 27, 2021 International Search Report issued in International Patent Application No. PCT/JP2021/003432.

Jul. 23, 2024 Office Action issued in Japanese Patent Application No. 2022-577994.

* cited by examiner

DISTANCE MEASURING DEVICE AND DISTANCE MEASURING METHOD

BACKGROUND

1. Technical Field

The present invention relates to a distance measurement apparatus and a distance measurement method.

2. Related Art

There is known a camera apparatus which captures an image and in which an outline of a subject is extracted based on an output of an AF area sensor, range finding is performed with priority given to the inside of the outline in a wide range finding area, focusing is performed based on range finding data thereof, which enables a main subject to be accurately brought into focus without being affected by its background (refer to, for example, Patent Document 1).

Patent Document 1: Japanese Patent Application Publication No. 2001-304855 General Disclosure (Item 1)

A distance measurement apparatus that may project light to measure a distance to a target object.

The distance measurement apparatus may include a control unit that controls a projection state of the light based on a detection result of the target object.

The distance measurement apparatus may include a light projection unit that projects the light controlled by the control unit onto the target object.

The distance measurement apparatus may include a processing unit that determines the distance to the target object based on a detection result of reflected light.

(Item 2)

The distance measurement apparatus may include an image capture unit that captures an image of the target object.

The control unit may detect the target object based on an image capture result obtained by the image capture unit.

(Item 3)

The light projection unit may project light onto the target object via an optical system.

(Item 4)

The image capture unit may capture the image of the target object via the optical system or an image capturing optical system different from the optical system.

(Item 5)

The light projection unit may include a light source unit that emits light.

The control unit may control any one of the light source unit and the optical system to control the projection state of the light.

(Item 6)

The projection state of the light may include any one of a radiation direction of the light and an intensity of the light.

(Item 7)

The image capture unit may further detect the reflected light from the target object.

(Item 8)

The distance measurement apparatus may include a detection unit that detects the reflected light from the target object.

(Item 9)

The distance measurement apparatus may include an analysis unit that analyzes the image capture result obtained by the image capture unit.

The analysis unit may analyze the image of the target object in the image capture result to identify the target object.

(Item 10)

The analysis unit may analyze the image of the target object based on a machine learning model.

The machine learning model may be constructed by machine learning in advance by setting, as training data, an image of a target object that is a target to which a distance is measured.

(Item 11)

The analysis unit may analyze the image of the target object by an image processing method.

The image processing method may include at least an edge detection method.

(Item 12)

The control unit may control any one of the optical system, the image capturing optical system different from the optical system, and the image capture unit such that the image of the target object analyzed by the analysis unit is captured at a center of an image capture region of the image capture unit.

(Item 13)

The analysis unit may identify the target object at a center of the image.

(Item 14)

The image of the target object includes a plurality of images, and the image capture unit may capture the plurality of images of the target object at different timings.

The analysis unit may identify the target object from an image difference between the plurality of the images.

(Item 15)

The analysis unit may detect resolution of the image, and

The control unit may control the optical system based on a detection result of the resolution, to enlarge or reduce the image of the target object.

(Item 16)

The analysis unit may analyze the image of the target object to identify a center or a center of gravity of the target object, and The control unit may control any one of the light projection unit and the optical system to project the light onto the identified center of the target object.

(Item 17)

The analysis unit may analyze the image of the target object to identify the target object, The control unit may control the light to scan the identified target object by using the light, and The processing unit may determine the distance to the target object based on a relationship between a scan position of the target object scanned by the light and the detection result of the reflected light.

(Item 18)

The distance measurement apparatus may further include a display unit that displays, on a display screen, the image of the target object obtained by the image capture unit.

(Item 19)

The display unit may display an object to be superimposed on the image of the target object, the object indicating a location on the target object onto which the light is projected, or the target object to which the distance is determined.

(Item 20)

The display unit may display the image of the target object obtained by the image capture unit such that a location on the target object onto which the light is projected is positioned at a center of a screen.

(Item 21)

The display screen may include a touch detection sensor that detects a touch operation by a user.

When at least one location included in the image is selected by the touch operation on the display screen, the control unit may control the light to project the light onto the at least one location.

(Item 22)

The distance measurement apparatus may further include a calculation unit that calculates, when a plurality of locations which are included in the image are selected by touch operations on the display screen, distances to the plurality of locations, or a distance and/or an area between the plurality of locations.

(Item 23)

The optical system may include at least one optical element for a correction among a lens element, a prism, or a mirror.

The control unit may drive the at least one optical element for the correction.

(Item 24)

The light projection unit may project the light onto the target object after the image capture unit captures the image of the target object.

(Item 25)

The control unit may control the optical system or the image capturing optical system to correct a blur of the distance measurement apparatus.

(Item 26)

A distance measurement method may project light to measure a distance to a target object.

The distance measurement method may control a projection state of the light based on a detection result of the target object.

The distance measurement method may project the light which is controlled by the controlling, onto the target object.

The distance measurement method may determine the distance to the target object based on a detection result of reflected light.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to claims. In addition, not all of the combinations of features described in the embodiments are essential to the solution of the invention.

Figure 1:
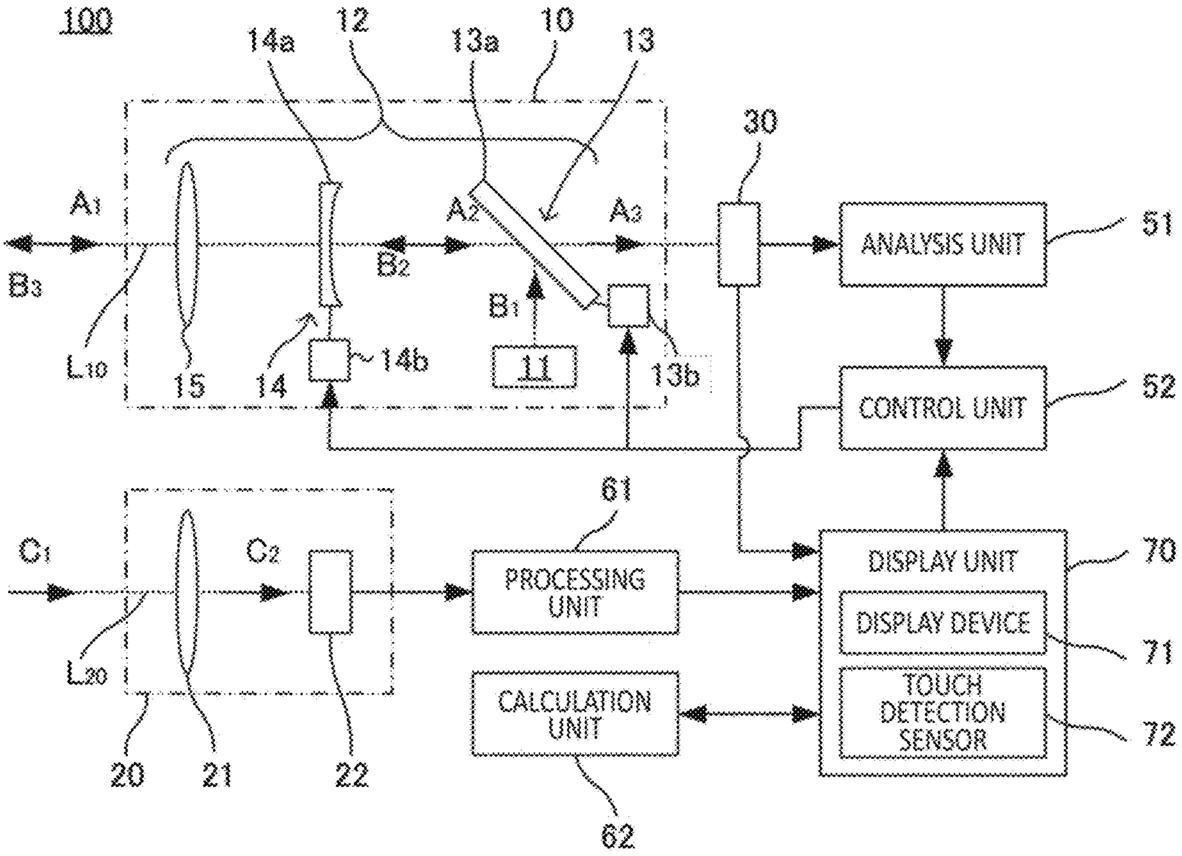
FIG. 1 shows a configuration of a distance measurement apparatus according to the present embodiment.

FIG. 1 shows a configuration of a distance measurement apparatus 100 according to the present embodiment. The distance measurement apparatus 100 is an apparatus that projects light $B_3$ to measure a distance to a target object. It should be noted that measuring the distance is simply referred to as ranging, and an operation thereof by the distance measurement apparatus 100 is also referred to as a ranging operation. A direction in which a light projection unit 10 emits the light $B_3$ along a reference axis $L_{10}$ (that is, a left direction in the drawing) is set as a front, and an opposite direction (that is, a right direction in the drawing) is set as a rear. In this context, an orientation (also referred to as the direction) of the reference axis $L_{10}$ is uniquely determined by an orientation of an apparatus body (that is, a housing that accommodates components) of the distance measurement apparatus 100. The distance measurement apparatus 100 includes the light projection unit 10, a detection unit 20, an image capture unit 30, an analysis unit 51, a control unit 52, a processing unit 61, a display unit 70, and a calculation unit 62. It should be noted that the analysis unit 51, the control unit 52, the processing unit 61, and the calculation unit 62 are functional units that are realized when an arithmetic processing device (not shown) executes a dedicated program.

The light projection unit 10 is a unit that projects the light $B_3$ controlled by the control unit 52 which will be described below, onto the target object via a light projection observation optical system (an example of an optical system) 12. The light projection unit 10 includes a light source 11 and the light projection observation optical system 12.

The light source 11 generates light $B_1$ with a pulse shape at a constant cycle, and causes the light $B_1$ to enter the light projection observation optical system 12. As the light source 11, for example, it is possible to adopt a semiconductor laser that oscillates an infrared ray. In one ranging operation, the light $B_1$ is emitted a predetermined number of times, for example, 320 times, at a constant cycle, for example, a cycle of 500 μs to 700 μs. It should be noted that the light source 11 may have a drive device (not shown), and the control unit 52 may control the drive device to tilt the light source 11. In this case, an emission direction of the light $B_1$ which is emitted from the light source 11 is changed, and the light $B_1$ can be deflected toward the target object.

The light projection observation optical system 12 is an optical system constituted by a plurality of optical elements that form and direct the light $B_1$, and includes a mirror 13, a correction lens 14, and an objective lens 15 as examples. These optical elements are arrayed along the reference axis $L_{10}$ of the light projection observation optical system 12.

Figure 2A:
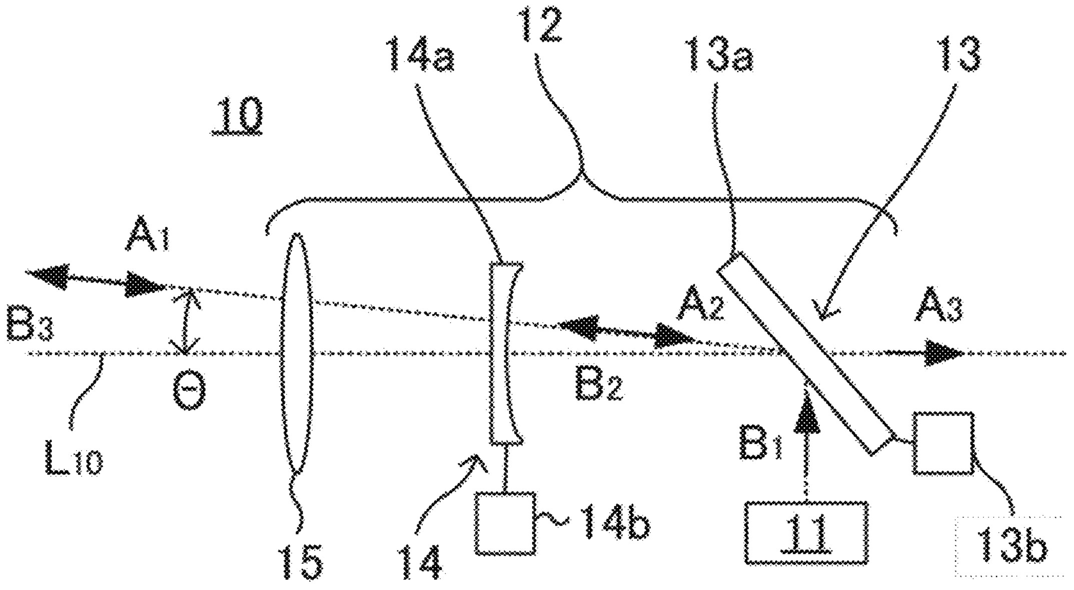
FIG. 2A shows a deflection of light by a mirror.

The mirror 13 is a mirror device which reflects the light or through which the light is transmitted according to a wavelength thereof, and has a dichroic reflection surface 13*a* and a drive device 13*b*. The dichroic reflection surface 13*a* is a mirror element which reflects the light in an infrared band and through which the light in a visible light band is transmitted. The dichroic reflection surface 13*a* is arranged on the reference axis $L_{10}$; reflects the light $B_1$ which is emitted from the light source 11 to send the light $B_1$ to the front direction along the reference axis $L_{10}$; causes visible light $A_1$ which enters from the front direction of the distance measurement apparatus 100 via the objective lens 15, to be transmitted; and sends out the visible light $A_1$ toward the image capture unit 30 that is arranged in the rear. The drive device 13*b* has a drive element such as an actuator and an electric motor, and tilts the dichroic reflection surface 13*a* by being controlled by the control unit 52 based on a detection result of a tilt of the dichroic reflection surface 13*a* by a rotation sensor (not shown) or the like. As shown in FIG. 2A, by the dichroic reflection surface 13*a* being tilted with respect to the reference axis $L_{10}$ by the drive device 13*b*, it is possible to deflect the emission direction of the light $B_3$ toward the target object that moves with respect to the apparatus body, or the target object that is deviated from the reference axis $L_{10}$.

Figure 2B:
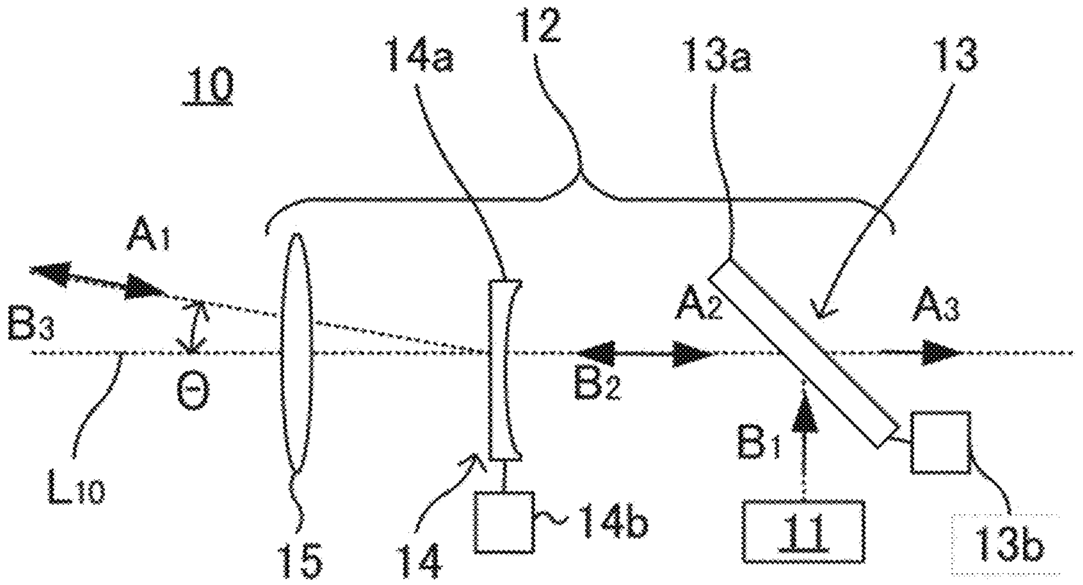
FIG. 2B shows the deflection of light by a correction lens.

The correction lens 14 is a lens device that deflects light $B_2$, and has a lens element 14*a* and a drive device 14*b*. The lens element 14*a* is an internal focus lens as an example, and is arranged on the reference axis $L_{10}$ between the mirror 13 and the objective lens 15. The drive device 14*b* has, for example, a drive element such as a voice coil motor or a piezoelectric motor, is controlled by the control unit 52 based on a detection result of displacement of the lens element 14*a* by a displacement sensor (not shown) or the like, and displace the lens element 14*a* in a direction intersecting the reference axis $L_{10}$ (in the present embodiment, two axis directions orthogonal to each other in a plane orthogonal to the reference axis $L_{10}$). As shown in FIG. 2B, the lens element 14*a* is displaced with respect to the reference axis $L_{10}$ by the drive device 14*b*, thereby deflecting the light $B_3$ (tilting the light $B_3$ with respect to the reference axis $L_{10}$). It should be noted that the correction lens 14 may be a vari-angle prism that is controlled by the control unit 52 and deforms asymmetrically with respect to the central axis.

The objective lens 15 is an optical element that: collimates the light $B_2$ which is output from the light source 11 and enters via the mirror 13 and the correction lens 14; sends the collimated light $B_2$ to the front direction of the distance measurement apparatus 100 as the light $B_3$; collimates the visible light $A_1$ which enters from the front direction of the distance measurement apparatus 100; and sends the collimated visible light $A_1$ to the rear direction. The objective lens 15 may be constituted by a plurality of optical elements including at least one lens element. The configuration may be made such that a focal position is driven in the front and rear direction by displacing, along the reference axis $L_{10}$, the objective lens 15 or an optical element by which the objective lens 15 is constituted.

It should be noted that the light projection observation optical system 12 may include a prism (not shown) instead of or in combination with the mirror 13. The prism is an optical element that sends, to the front direction, the light $B_1$ which is emitted from the light source 11 and that sends, to the rear direction, the visible light $A_1$ which enters from the front direction of the distance measurement apparatus 100 via the objective lens 15, and it is possible to adopt a roof prism, a Porro prism, or the like, for example. The prism has a drive device that drives a holding frame of the prism, thereby displacing and/or rotating the prism with respect to the reference axis $L_{10}$, and thus can deflect the emission direction of the light $B_3$ toward the target object that moves with respect to the apparatus body.

The mirror 13, correction lens 14, and the prism (not shown) are examples of an optical element for a correction, and only at least one of them needs to be included in the light projection observation optical system 12.

The detection unit 20 is a unit that detects reflected light from the target object which is generated by projecting the light $B_3$. The detection unit 20 includes a light receiving lens 21 and a detection element 22.

The light receiving lens 21 is an optical element that collects reflected light $C_1$ from the target object. The reflected light $C_1$ collected by the light receiving lens 21 is sent to the detection element 22 as reflected light $C_2$. It should be noted that the light receiving lens 21 has a reference axis $L_{20}$ different from that of the objective lens 15 (the light projection observation optical system 12) of the light projection unit 10.

The detection element 22 is an element that receives the reflected light $C_2$ and that outputs a detection signal corresponding to an intensity thereof. It is possible for the detection element 22 to adopt, for example, a photodiode, a phototransistor, or the like that has a sensitivity to a band of the light $B_3$. It should be noted that the detection element 22 may include, on or in front of a detection surface thereof, a band transmission filter that causes the light in a narrow band including the reflected light $C_2$, to be transmitted and that blocks or attenuates the light in another band. The detection signal is converted into a digital signal, and is supplied to the processing unit 61.

In the detection unit 20 having the configuration described above, the reflected light $C_1$ reflected (or scattered) from the target object positioned in front of the distance measurement apparatus 100, is incident on the light receiving lens 21. The reflected light $C_1$ is collected by the light receiving lens 21, and is detected by the detection element 22 as the reflected light $C_2$. The detection signal is output to the processing unit 61.

The image capture unit 30 is a unit that captures an image of the target object via the light projection observation optical system 12. The image capture unit 30 has, as an example, a CMOS image sensor, and performs a surface detection of visible light $A_3$ which enters from the front direction of the apparatus body via the light projection observation optical system 12. It should be noted that a filter element through which the visible light is transmitted and which cuts the light (infrared light) may be provided on a light receiving surface of an image sensor. A detection result thereof, that is, a captured image of the target object is transmitted to the analysis unit 51 and the display unit 70. It should be noted that an optical axis of the light $B_3$ which is emitted to the front direction of the apparatus body and an optical axis of the visible light $A_1$ entering from the front direction of the apparatus body coincide with each other on the reference axis $L_{10}$, and thus it is possible to project the light $B_3$ onto the target object on the center of the image which is captured and obtained by the image capture unit 30.

The analysis unit 51 is a unit that analyzes an image capture result obtained by the image capture unit 30, that is, the captured image of the target object. The analysis unit 51 analyzes the captured image of the target object, for example, based on a machine learning model, and identifies the target object in the captured image. In this context, the machine learning model may be, for example, a multi-layer neural network (DNN) that is constructed by deep learning (deep learning), and is constructed by machine learning in advance by setting, as training data, a position of the target object that is a target to which a distance is measured, or a plurality of images. In this context, the number of target objects to be identified is not limited to one, and a plurality of target objects may be identified. The machine learning may be performed in advance on a plurality of types of target objects such that a user can select which type of the target object to identify at a time of the ranging.

Figure 3:
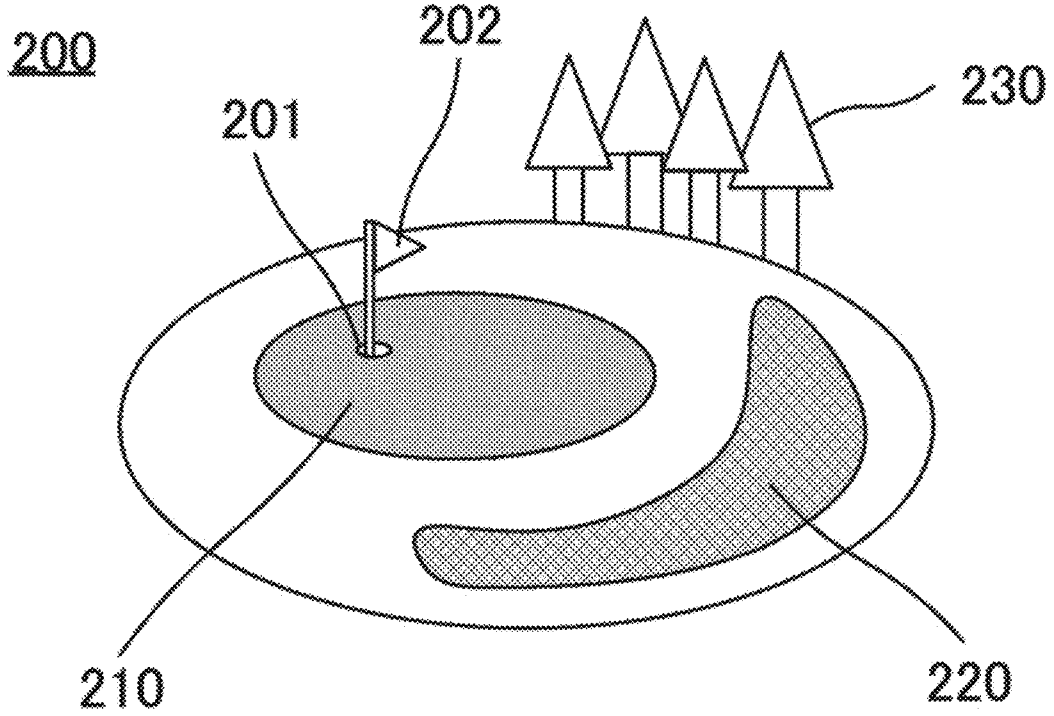
FIG. 3 shows an example of a target object that is able to be identified from a captured image.

FIG. 3 shows an example of a target object that is able to be identified from a captured image 200 by the analysis unit 51. In the present example, on a golf course, the user who is a golf player uses the distance measurement apparatus 100 to measure the distance to a pin flag 202 as the target object, to know the distance to a cup 201 on a green 210. The analysis unit 51 identifies, by the machine learning model, the pin flag 202 from the captured image 200 of the target object obtained by the image capture unit 30, and calculates a deviation with respect to the center of the image (that is, the reference axis L w of the light projection observation optical system 12). It should be noted that the target object is not limited to the pin flag 202, and for example, may be combined with an object positioned near the cup 201 which is the target object, such as the green 210, a pin (which supports a flag of the pin flag 202), or the like. In this manner, an identification precision of the target object by the machine learning model is enhanced. In addition, when the object positioned near the cup 201 which is the target object, is used, color information specific to the object (for example, green for green 210) may be used.

Figure 4A:
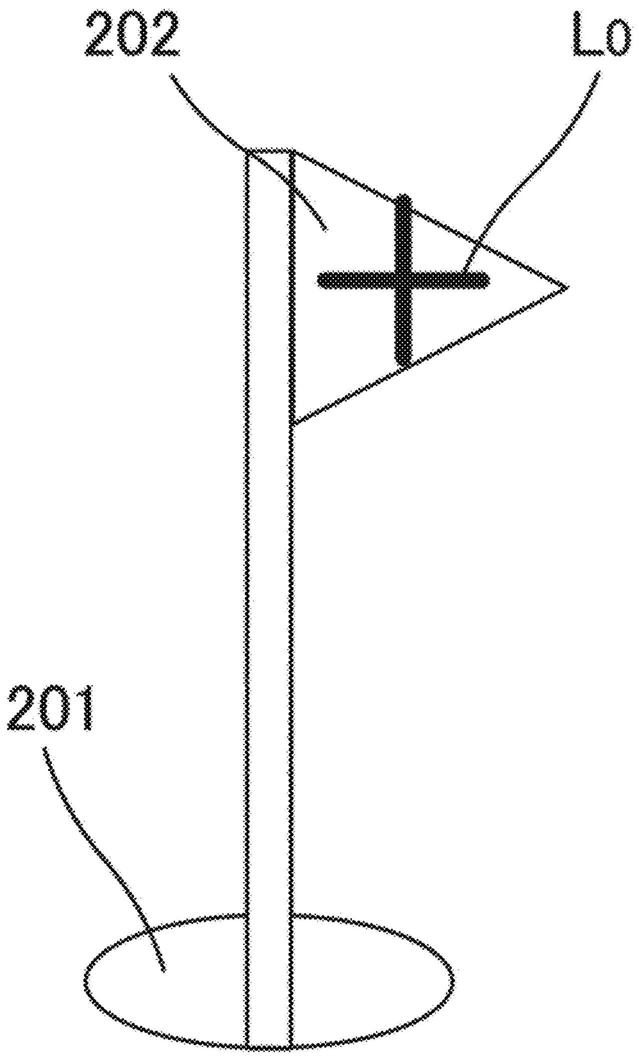
FIG. 4A shows the target object that is identified from the captured image.

FIG. 4A shows the target object that is identified from the captured image 200. The analysis unit 51 identifies the target object on the reference axis $L_{10}$. When the user points the apparatus body toward the direction of the target object and positions the pin flag 202 which is the target object on an inside of a display screen 71*a*, the analysis unit 51 identifies the pin flag 202 based on the machine learning model. In this context, a shape of the pin flag 202 is usually determined, and thus the analysis unit 51 identifies the center or the center of gravity from the shape of the pin flag 202. Alternatively, a plurality of images of the pin flag 202 may be captured at different timings by the image capture unit 30, and from an image difference between the plurality of images (offset between the images for which a difference in pixel value is smallest), it is possible to identify the center or the center of gravity of the pin flag 202.

In addition, when the user moves the apparatus body to position the target object near the center of the screen of the display screen 71*a*, it is possible to further enhance the identification precision of the target object. In addition, the image of the target object may be registered in the apparatus body in advance, and according to a situation when the apparatus body is operated, a suitable machine learning model may be set to be automatically selected. For example, in a case where the situation in which the apparatus body is operated is a golf game, when the user selects the golf game, the flag may be automatically selected as the machine learning (completed) model. In addition, the user may capture the image of the target object and register the captured image in the apparatus body at a time of a first ranging operation or the like, and perform the set such that the registered machine learning (completed) model is automatically selected at times of subsequent operations.

Figure 4B:
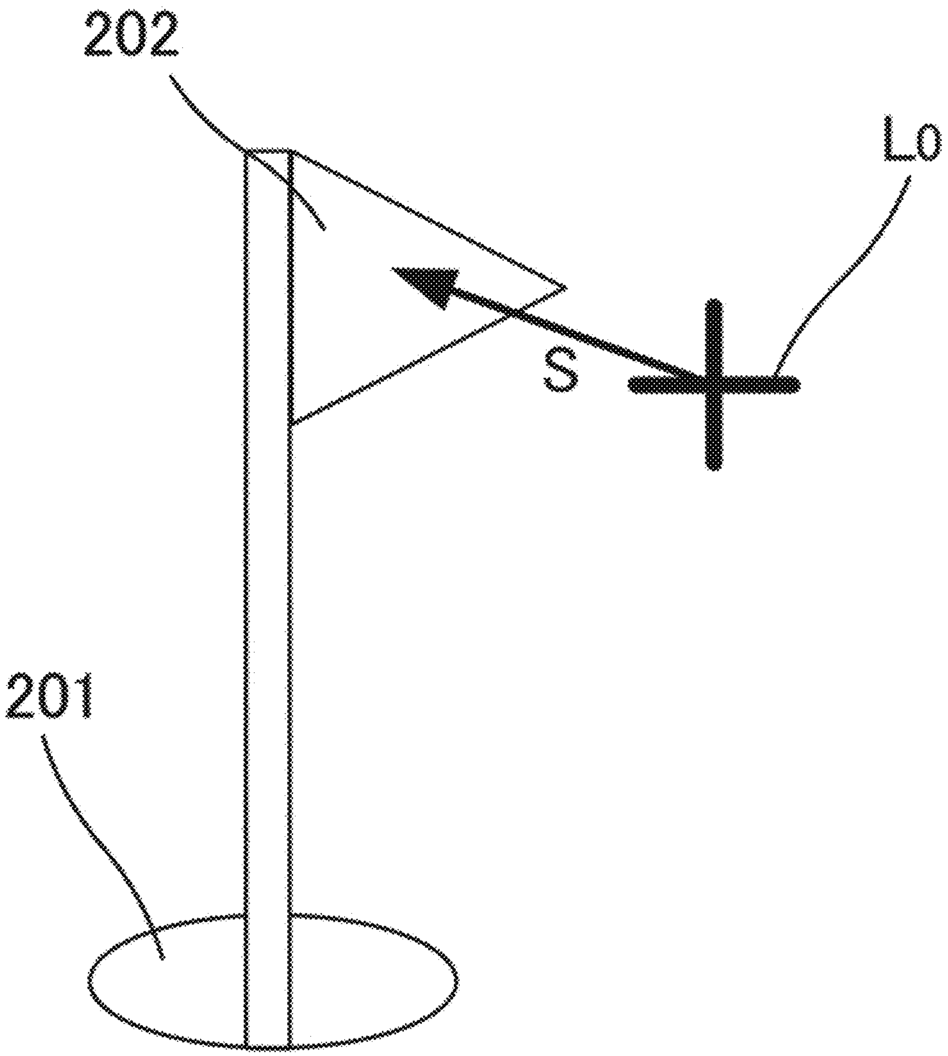
FIG. 4B shows a deviation from a reference axis which is detected for the identified target object.

FIG. 4B shows a deviation from a reference axis $L_{10}$ which is detected for the identified target object. In the present example, the target object is deviated from the center of the image (the reference axis $L_{10}$). As described above, once the target object is identified from the captured image 200, the analysis unit 51 recognizes the target object at any position in the captured image 200, and detects a deviation S (the center coordinates of the target object with respect to the center coordinates at the center of the image in the display screen 71*a*) of the target object with respect to the center of the image corresponding to the position of the reference axis $L_{10}$. A detection result of the deviation S is transmitted to the control unit 52. It should be noted that the center of the image in the display screen 71*a* is also an intersection of the reference axis $L_{10}$ of the detection element 22, and the detection element 22.

It should be noted that instead of using the machine learning model, an image processing method may be used to analyze the captured image of the target object. The image processing method includes an edge detection method that detect an outline of the target object in the captured image. This makes it possible to also detect various objects existing on the golf course in the captured image 200 shown in FIG. 3, for example, a bunker 220, woods 230, another hazard, or the like.

It should be noted that when the target object cannot be detected, or the like, the analysis unit 51 may detect resolution of the captured image of the target object, and the control unit 52 may control the light projection observation optical system 12 based on the detection result of the resolution, and enlarge or reduce the image of the target object. The image analysis by the analysis unit 51 will be further described below.

Figure 4C:
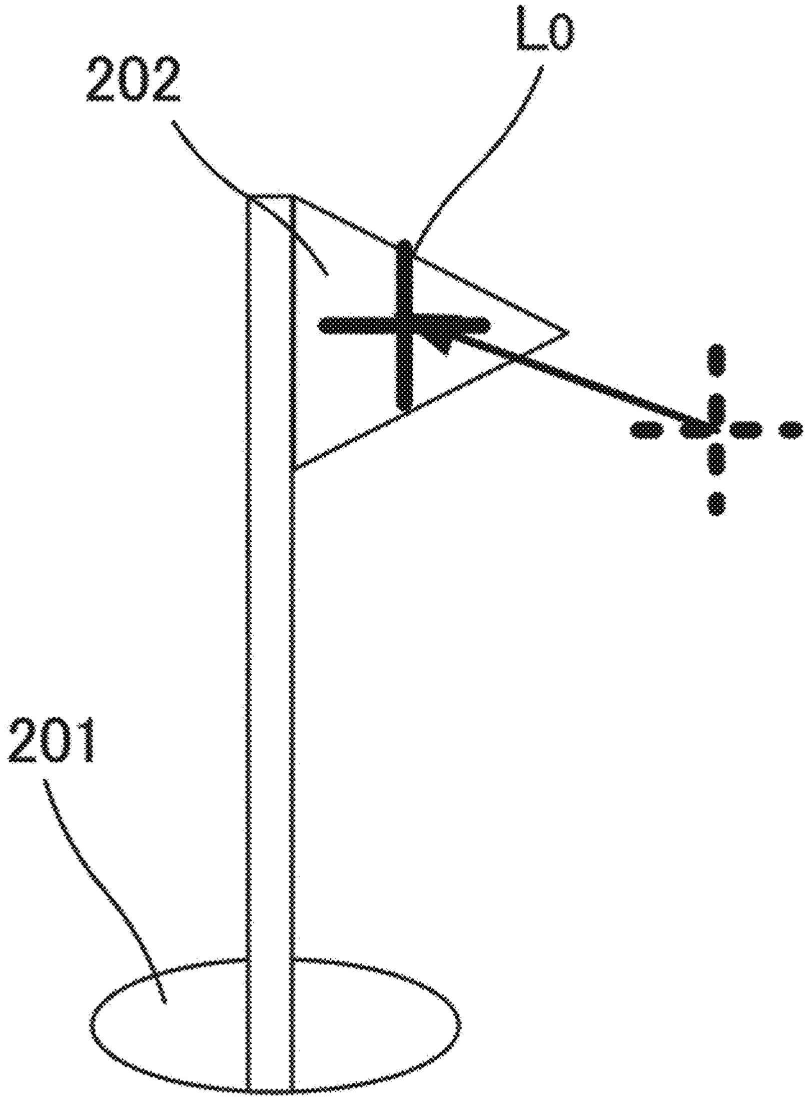
FIG. 4C shows a blur correction for the identified target object.

The control unit 52 is a unit that controls a projection state of the light $B_3$, based on the image capture result obtained by the image capture unit 30. The control unit 52 controls the light projection unit 10 and/or the light projection observation optical system 12 to tilt the mirror 13 with respect to the reference axis $L_{10}$, displaces the correction lens 14 from the reference axis $L_{10}$, displaces and/or rotates the prism (not shown), and/or tilting the light source 11 with respect to the reference axis $L_{10}$, thereby deflecting the light $B_3$ in the determined direction from the deviation S (and the distance to the target object). In this manner, as shown by using an arrow in FIG. 4C, the light $B_3$ continues to be radiated to the pin flag 202 which is the target object identified by the analysis unit 51, particularly the center or the center of gravity of the pin flag 202.

It should be noted that there is a correspondence between a deflection angle $\Theta$ when the light $B_3$ is deflected, and an angle of view of the display screen 71*a* determined by a magnification of the optical system, and thus by finding the deviation S which represents an amount of the deviation of the center coordinates or the coordinates of the center of gravity (a pixel) of the target object from the center coordinates (the pixel) of the center of the image of the display screen 71*a*, it is possible to calculate the deflection angle $\Theta$ of the light $B_3$ toward the target object.

It should be noted that the control unit 52 may control the light projection unit 10 and/or the light projection observation optical system 12, and deflect the light $B_3$ to perform a scan by the light $B_3$. In addition, the control unit 52 may control the projection state of the light $B_3$ by changing not only the projection direction of the light $B_3$ but also the intensity. For example, when a reflectance of the target object is low (or high) and the intensity of the reflected light $C_1$ which is detected by the detection unit 20 is low (high), the intensity of the light $B_3$ may be increased (decreased). In addition, when the target object is scanned by the light $B_3$, the scan may be performed across the target object, that is, the target object and a surrounding region thereof may be included in the scan, or only an inside of a region of the target object may be scanned.

In addition, as described above, the control unit 52 controls the light projection unit 10 and/or the light projection observation optical system 12, so that the image of the target object analyzed by the analysis unit 51 is captured at the center of an image capture region of the image capture unit 30. In this way, by the image of the target object being captured at the center of the image capture region, the detection precision is enhanced.

The processing unit 61 is a unit that determines the distance to the target object based on the detection result of the reflected light $C_1$ by the detection unit 20. A distance D to the target object is calculated by $D=T\times c/2$, by determining a detection time T from the radiation of the light $B_3$ by the light projection unit 10 to the detection of the reflected light $C_1$ by the detection unit 20, to use a light speed c. In this context, because the detection time T is a time required for the light to move a distance corresponding to a reciprocation from a measurement position at which measurement light is emitted to the target object, ½ of the detection time T is multiplied by the light speed. It should be noted that the detection time T may be determined by averaging results respectively obtained for multiple times of radiation of the measurement light.

It should be noted that the processing unit 61 may determine the distance to the target object by scanning the target object by the light $B_3$. In such a case, the captured image of the target object is analyzed by the analysis unit 51 to identify the target object; the light projection unit 10 and/or the light projection observation optical system 12 is controlled by the control unit 52; the identified target object is scanned by using the light $B_3$, and at the same time, the reflected light $C_1$ is detected by the detection unit 20; and the processing unit 61 determines the distance to the target object based on a relationship between a scan position of the target object scanned by the light $B_3$, and the detection result of the reflected light $C_1$. In this context, from the relationship between the scan position of the target object, and the detection result of the reflected light, it is possible to determine the distance for the scan position of the target object where a detection intensity of the reflected light $C_1$ is maximum, or determine the distance for all scan positions in the target object, to set an average distance or a minimum distance as the distance to the target object.

It should be noted that the processing unit 61 may determine the distance to the target object by scanning, by the light $B_3$, an entire deflection range thereof or an entire angle of view range of the captured image. In such a case, the light projection observation optical system 12 is controlled by the control unit 52; by using the light $B_3$, the deflection range thereof or the angle of view range of the captured image is scanned, and at the same time, the reflected light $C_1$ is detected by the detection unit 20; and the processing unit 61 detects the distance to the target object based on the relationship between the scan position scanned by the light $B_3$ and the detection result of the reflected light $C_1$, to determine the distance to the target object. In this context, the processing unit 61 may identify the target object, from the relationship between the scan position and the detection result of the reflected light $C_1$, for example, at the scan position where the detection intensity of the reflected light $C_1$ is maximum, and determine the distance for the target object. In addition, the processing unit 61 may identify the target object, from the relationship between the scan position and the detection result of the detection time T, for example, at the position where the detection time T is the minimum, and determine the distance for the target object.

The processing unit 61 supplies, to the display unit 70, the determined distance to the target object. The processing unit 61 may store the determined distance to the target object in a storage device (not shown).

The display unit 70 is a unit that displays the captured image of the target object obtained by the image capture unit 30 and the distance to the target object determined by the processing unit 61, and has a display device 71 and a touch detection sensor 72. The display device 71 may be an electronic viewfinder or a liquid crystal display that has a display screen which is exposed on the apparatus body. It should be noted that, in the present embodiment, the touch detection sensor 72 is adopted together with the display device 71, and thus the liquid crystal display is adopted as the display device 71. The touch detection sensor 72 is, for example, a capacitance sensor, and is arranged on the display screen 71*a* of the display device 71, and detects a touch operation by the user and a touched location on the display screen 71*a*.

The calculation unit 62 is a unit that calculates, when one or more locations which are included in the captured image are selected by touch operations on the display screen 71*a*, distances to the one or more locations and a distance and/or an area between the plurality of locations. These calculations will be described below.

Figure 5A:
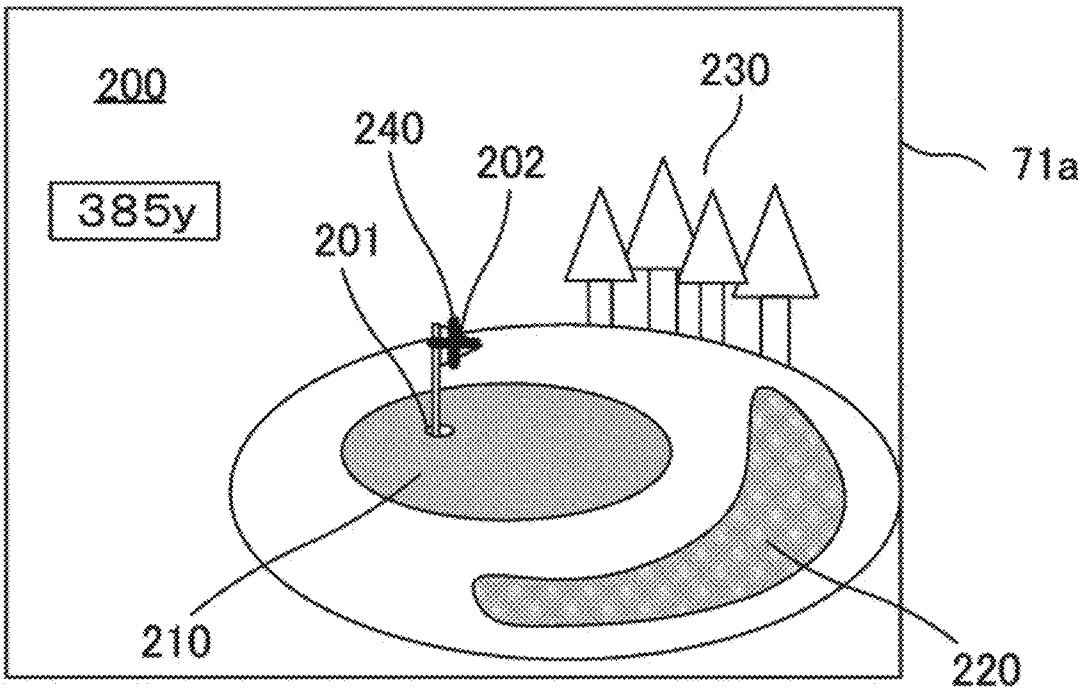
FIG. 5A shows an example of a display on a display screen.

FIG. 5A shows an example of a display which is displayed on the display screen 71*a* by the display unit 70. On the display screen 71*a*, the display unit 70 displays the captured image 200, and a mark 240 which is superimposed on the captured image 200 to indicate a location on the target object onto which the light $B_3$ is projected (or the distance is displayed). In this context, in the captured image 200 of the target object obtained by the image capture unit 30, the display unit 70 displays the location on the pin flag 202 onto which the light $B_3$ is projected, that is, the mark 240. In addition, the determined distance "385 y (yards)" to the target object is displayed. It should be noted that the mark 240 may be displayed to be positioned at the center of the screen. In addition, instead of displaying the mark 240 which indicates the location on the target object onto which the light $B_3$ is projected, the target object to which the distance is displayed may be highlighted and displayed, or an object (for example, a mark or an arrow) may be displayed to be superimposed on the target object to which the distance is displayed.

Figure 5B:
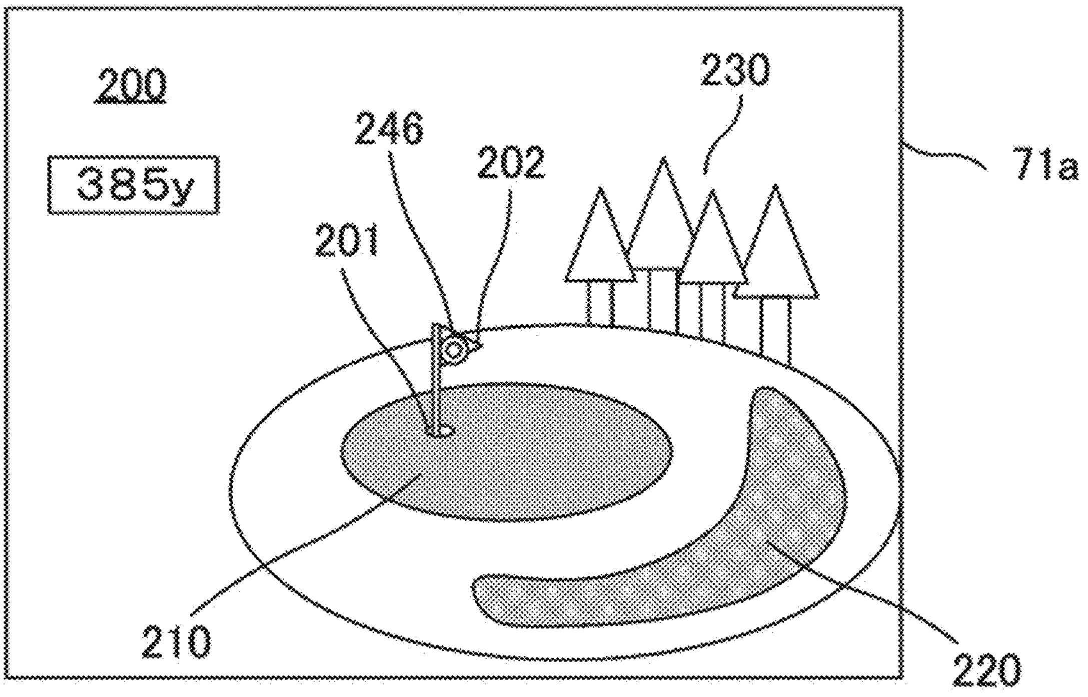
FIG. 5B shows another example of the display on the display screen.

FIG. 5B shows an example of a display operation when the display unit 70 detects, by the touch detection sensor 72, the touch operation by the user on the display screen 71*a*. In FIG. 5B, the pin flag 202 is displayed as the target object on the display screen 71*a* of the display unit. It is assumed that the user selects the pin flag 202 that is included in the captured image 200 by performing the touch operation on the display screen 71*a* with a finger or the like. In this manner, a mark 246 indicating the touch position is displayed to be superimposed on the pin flag 202. The touch detection sensor 72 detects the location (the coordinates) on the display screen 71*a* on which the user performs the touch operation; and the analysis unit 51 calculates the deviation S of the location (the coordinates), on the display screen 71$a$ on which the touch operation is performed, from the center coordinates of the center of the image on the display screen 71$a$, to calculate the deflection angle Θ of the light $B_3$ toward the target object. The control unit 52 directs and projects the light $B_3$ toward the pin flag 202 at the deflection angle Θ calculated by controlling the light projection unit 10 and/or the light projection observation optical system 12, and calculates the distance to the pin flag 202.

Figure 6A:
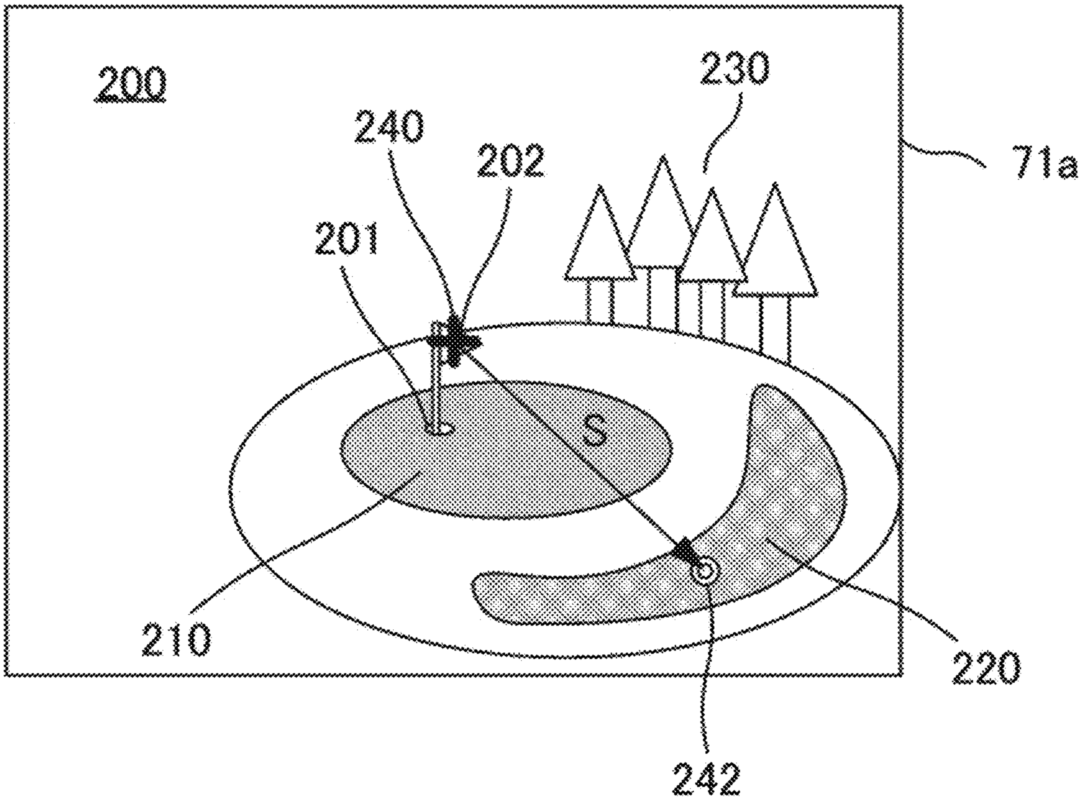
FIG. 6A shows an example of a display operation when a touch operation on the display screen is detected.
Figure 6B:
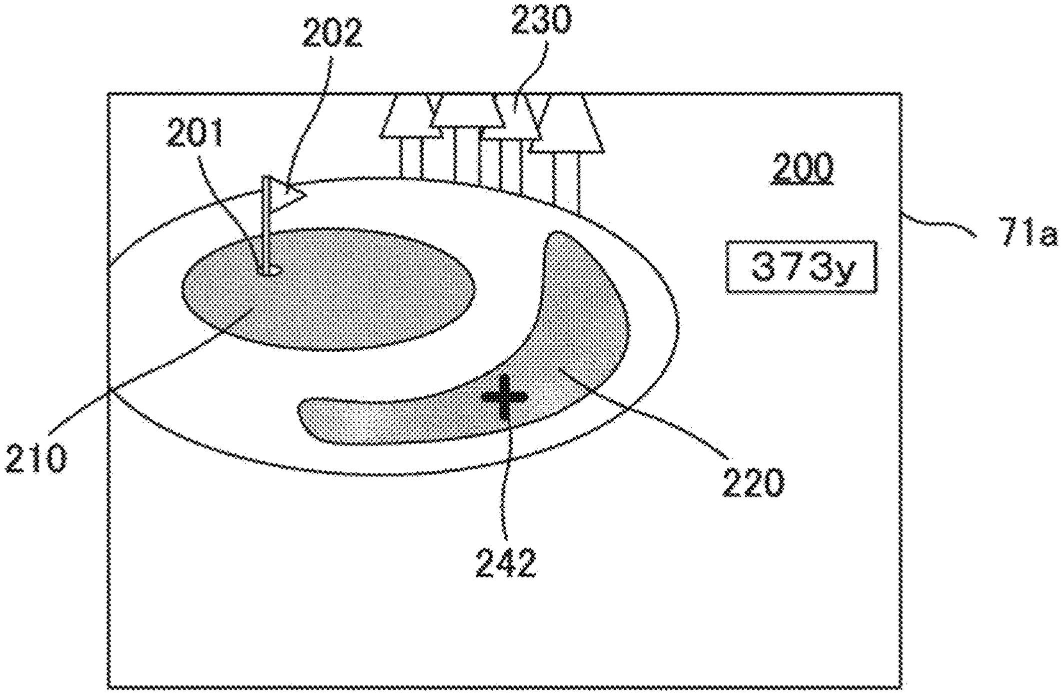
FIG. 6B shows an example of the display operation when the touch operation on the display screen is detected.

FIG. 6A and FIG. 6B show examples of the display operation when the display unit 70 detects, by the touch detection sensor 72, the touch operation by the user on the display screen 71$a$. In a state shown in FIG. 6A, the distance measurement apparatus 100 identifies the pin flag 202 that is the target object in the captured image 200, gets a lock on it to project the light $B_3$, and continuously measures the distance to the pin flag 202. In this state, it is assumed that the user selects the bunker 220 that is included in the captured image 200 by performing the touch operation on the display screen 71$a$ with the finger or the like. In such a case, by the touch detection sensor 72 detecting the location on the display screen 71$a$ on which the user performs the touch operation, the display unit 70 displays a mark 242 on the bunker 220 which is the location selected to be superimposed on the captured image 200; the analysis unit 51 detects the deviation S to the bunker 220 which is the selected location with respect to the pin flag 202 which is the target object previously identified or selected; the control unit 52 controls the light projection unit 10 and/or the light projection observation optical system 12 based on the detection result of the deviation S, and directs and projects the light $B_3$ toward the selected bunker 220. In this manner, as shown in FIG. 6B, the display unit 70 displays, on the display screen 71$a$, the mark 242 indicating the location on the captured image 200 and the bunker 220 onto which the light $B_3$ is projected such that the mark is positioned in the center of the screen. In addition, the determined distance "373 y (yards)" to the bunker 220 is displayed.

Figure 7A:
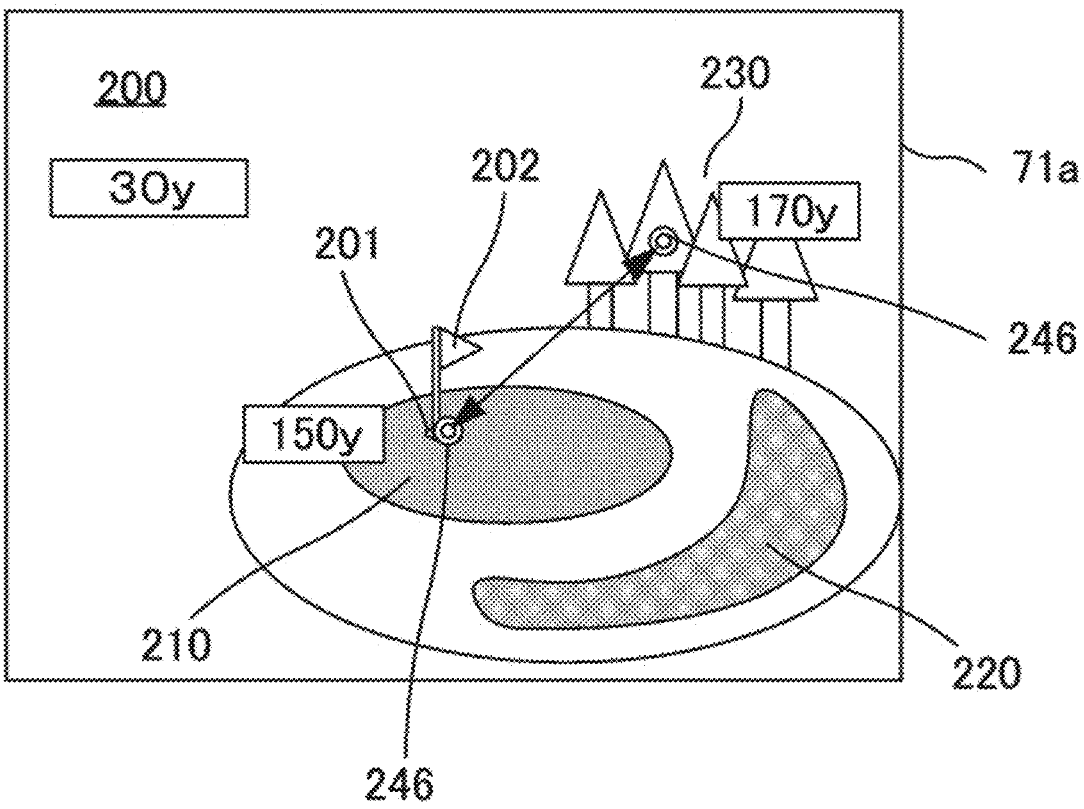
FIG. 7A shows examples of display operations when a plurality of touch operations on the display screen are detected.

FIG. 7A shows examples of display operations when the display unit 70 detects, by the touch detection sensor 72, a plurality of touch operations by the user on the display screen 71$a$. In this example, the user captures, as the target object, an image of a cup 201 on the green 210 by using the distance measurement apparatus 100, and the captured image 200 thereof is displayed on the display screen 71$a$. In this state, it is assumed that the user performs the touch operation on the display screen 71$a$ with the finger or the like, to select the locations of the cup 201 on the green 210, and the woods 230 behind the green 210, which are included in the captured image 200. In such a case, by the touch detection sensor 72 detecting the location on the display screen 71$a$ on which the user performs the touch operation, the display unit 70 displays the mark 246 on two locations selected to be superimposed on the captured image 200; the control unit 52 controls the light projection observation optical system 12 such that the light $B_3$ is projected onto each location; the processing unit 61 determines the distance to each location; and based on the determined distances to the two locations and the angle of view between the two locations, the calculation unit 62 calculates the distance between them. In this manner, the distance "150 y" to the cup 201, and the distance "170 y" to the woods 230, which are determined, are displayed on the display screen 71$a$; and the distance "30 y" which is the calculation result between the cup 201 and the woods 230, is displayed on the display screen 71$a$; and from the distance from the cup 201 to the woods 230, it is possible for the user to evaluate a risk of going out of bounds when a shot goes over the green 210.

Figure 7B:
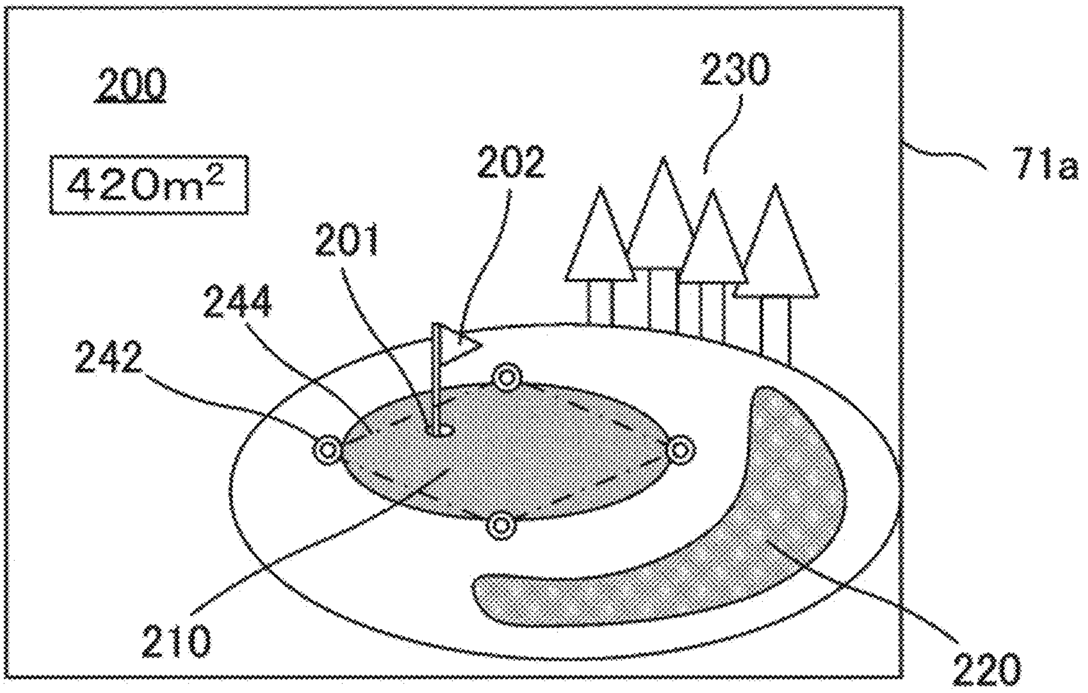
FIG. 7B shows other examples of the display operations when the plurality of touch operations on the display screen are detected.

FIG. 7B shows other examples of the display operations when the display unit 70 detects, by the touch detection sensor 72, the plurality of touch operations by the user on the display screen 71$a$. In this example, the user captures, as the target object, the image of the green 210 by using the distance measurement apparatus 100, and the captured image 200 thereof is displayed on the display screen 71$a$. In this state, it is assumed that the user performs the touch operation on the display screen 71$a$ with the finger or the like, to select a plurality (four in the present example) of locations along the outline of the green 210 which is included in the captured image 200. In such a case, by the touch detection sensor 72 detecting the location on the display screen 71$a$ on which the user performs the touch operation, the display unit 70 displays the mark 242 on four locations selected to be superimposed on the captured image 200; and the calculation unit 62 calculates an area of an area 244 which is surrounded by the four locations. The calculation result of the area of the area 244 is displayed on the display screen 71$a$, and it is possible for the user to know an approximate size of the green 210.

Figure 8:
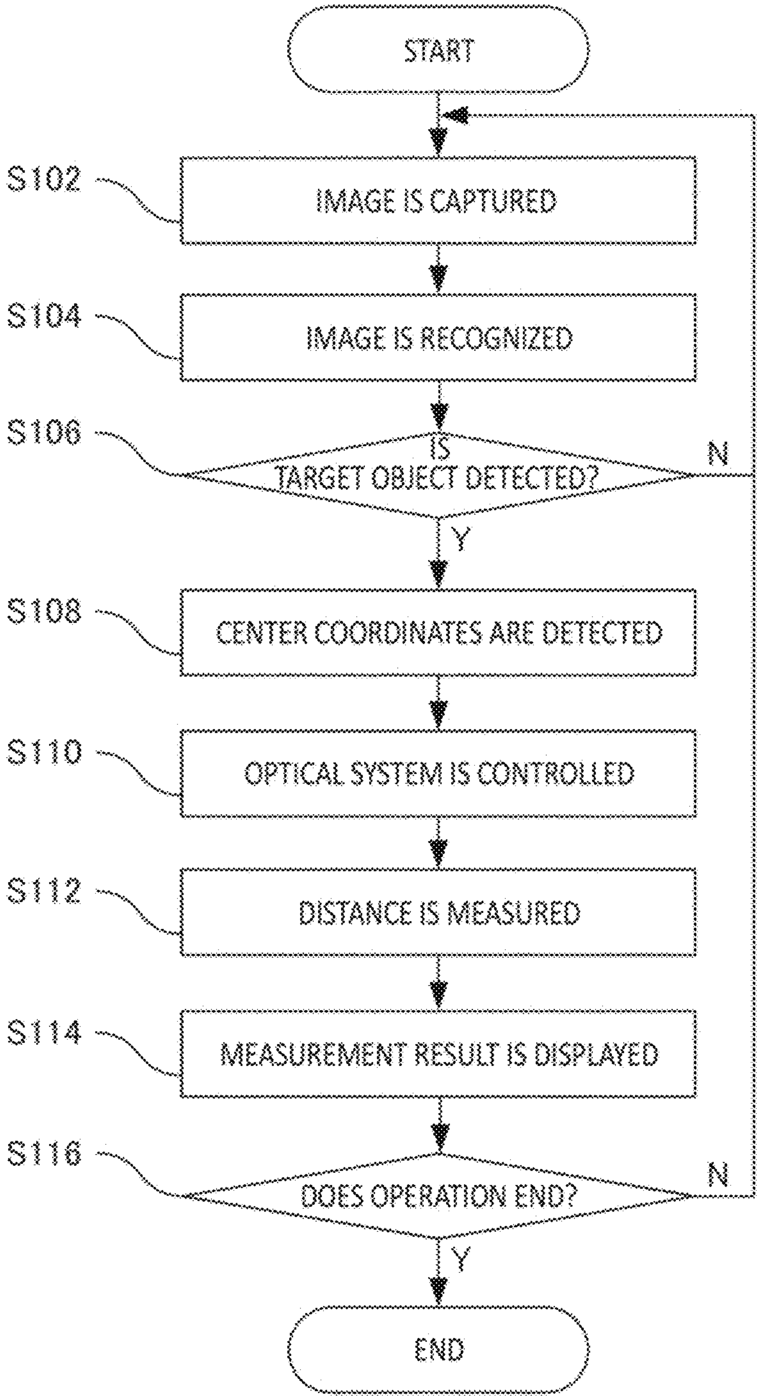
FIG. 8 shows a flow of a distance measurement method according to the present embodiment.

FIG. 8 shows a flow of a distance measurement method according to the present embodiment. The ranging operation is started when the user presses an operation button (not shown) provided on the apparatus body of the distance measurement apparatus 100. In the present example, it is assumed that on the golf course as shown in FIG. 3, the user who is a golf player uses the distance measurement apparatus 100 to set the pin flag 202 as the target object, and measures the distance to the pin flag 202, to know the distance to the cup 201 on the green 210.

In step S102, the image of the target object is captured by the image capture unit 30 via the light projection observation optical system 12. As shown in FIG. 3, the images of the pin flag 202 which is the target object, the surrounding green 210, and the like are captured. The captured image is displayed, by the display unit 70, on the display screen 71$a$ of the display device 71.

Next, the projection state of the light $B_3$ is controlled based on the image capture result obtained in step S102. Specifically, the following steps S104 to S110 are executed.

In step S104, the captured image of the target object obtained in step S102 is analyzed by the analysis unit 51. It should be noted that at the time of the first ranging operation or the like, as shown in FIG. 4A, in a case of where the user swings the apparatus body up, down, to the left, and to the right to position the pin flag 202 which is the target object, on the reference axis $L_{10}$ (that is, the center of the image which is displayed on the display screen 71$a$), the analysis unit 51 identifies the pin flag 202. After this, it becomes possible for the analysis unit 51 to identify the pin flag 202 at any position within the captured image.

In step S106, a determination over whether the target object is detected is performed by the analysis unit 51. If the pin flag 202 does not exist in the captured image, the analysis unit 51 cannot detect the pin flag 202, and determines that the target object is not detected, and processing returns to step S102. Therefore, the user moves the apparatus body to position the pin flag 202 in the captured image. In doing so, the analysis unit 51 detects the pin flag 202 in the captured image, and determines that the target object is detected, and the processing proceeds to step S108.

In step S108, the center of the pin flag 202 which is the target object is identified by the analysis unit 51. As described above, the analysis unit 51 identifies the center of the pin flag 202 from the center of the shape of the target object or the image difference between the plurality of images, and as shown in FIG. 4B, and detects a deviation S (the center coordinates of the target object with respect to the center coordinates at the center of the image in the display screen 71*a*) of the target object with respect to the center of the image corresponding to the position of the reference axis $L_{10}$.

In step S110, at least one optical element for the correction which is included in the light projection observation optical system 12 is controlled by the control unit 52 based on the analysis result of the image of the target object obtained in step S108. The control of the optical element for the correction is as described above. That makes it possible for the light $B_3$ to be radiated to the center of the pin flag 202, as shown by using the arrow in FIG. 4C.

In step S112, the distance to the target object is measured. The light projection unit 10 projects the light $B_3$ onto the center of the pin flag 202 via the light projection observation optical system 12. Next, the detection unit 20 detects the reflected light $C_1$ from the pin flag 202 which is generated by the projection of the light $B_3$. Finally, the processing unit 61 determines the distance D to the pin flag 202 based on the detection result of the reflected light $C_1$. The details of projecting the light $B_3$, detecting the reflected light $C_1$, and determining the distance D are as described above.

It should be noted that timings of the image capture in step S102 and the projection of the light $B_3$ in step S112 are set to be different from each other such that the image of the target object is captured by the image capture unit 30 in step S102, and then the light $B_3$ is projected onto the target object by the light projection unit 10 in step S112. That makes it possible to prevent the reflected light $C_1$ which is generated by projecting the light $B_3$ onto the target object, from being detected by the image capture unit 30, when the image of the target object is captured in step S102.

In step S114, as shown in FIG. 5A, by the display unit 70, the distance "385 y (yards)" to the target object determined in step S112 is displayed, on the display screen 71*a*, together with the pin flag 202 and the captured image 200 around the pin flag 202 obtained in step S102.

In step S116, a determination is performed over whether to end the ranging operation. If the operation button (not shown) is pressed again by the user, it is determined that the ranging operation continues, and the processing returns to step S102, and if the operation button is not pressed, it is determined that the ranging operation ends, and the flow ends.

The distance measurement apparatus 100 according to the present embodiment includes: the light projection unit 10 that projects the light $B_3$ onto the target object via the light projection observation optical system 12; the image capture unit 30 that captures the image of the target object via the light projection observation optical system 12; the analysis unit 51 that analyzes the image of the target object obtained by the image capture unit 30; and the control unit 52 that controls the light projection observation optical system 12 based on the analysis result by the analysis unit 51. With this, it is possible to accurately project the light onto the target object and determine the distance to the target object by: capturing the image of the target object via the light projection observation optical system 12 through which the light that is projected onto the target object, passes; analyzing the captured image of the target object obtained thereby; and controlling the light projection observation optical system 12 based on the analysis result thereof. In addition, the user does not need to collimate the region including the target object to visually recognize the target object, and thus it is easy to recognize the target object.

It should be noted that the distance measurement apparatus 100 according to the present embodiment adopts the configuration in which the image of the target object is captured by the image capture unit 30, and the reflected light $C_1$ from the target object which is generated by projecting the light $B_3$ is detected by the detection unit 20; however, instead of this, a configuration in which the image capture unit 30 captures the image of the target object, and also detects the reflected light $C_1$ from the target object which is generated by projecting the light $B_3$, may be adopted.

Figure 9:
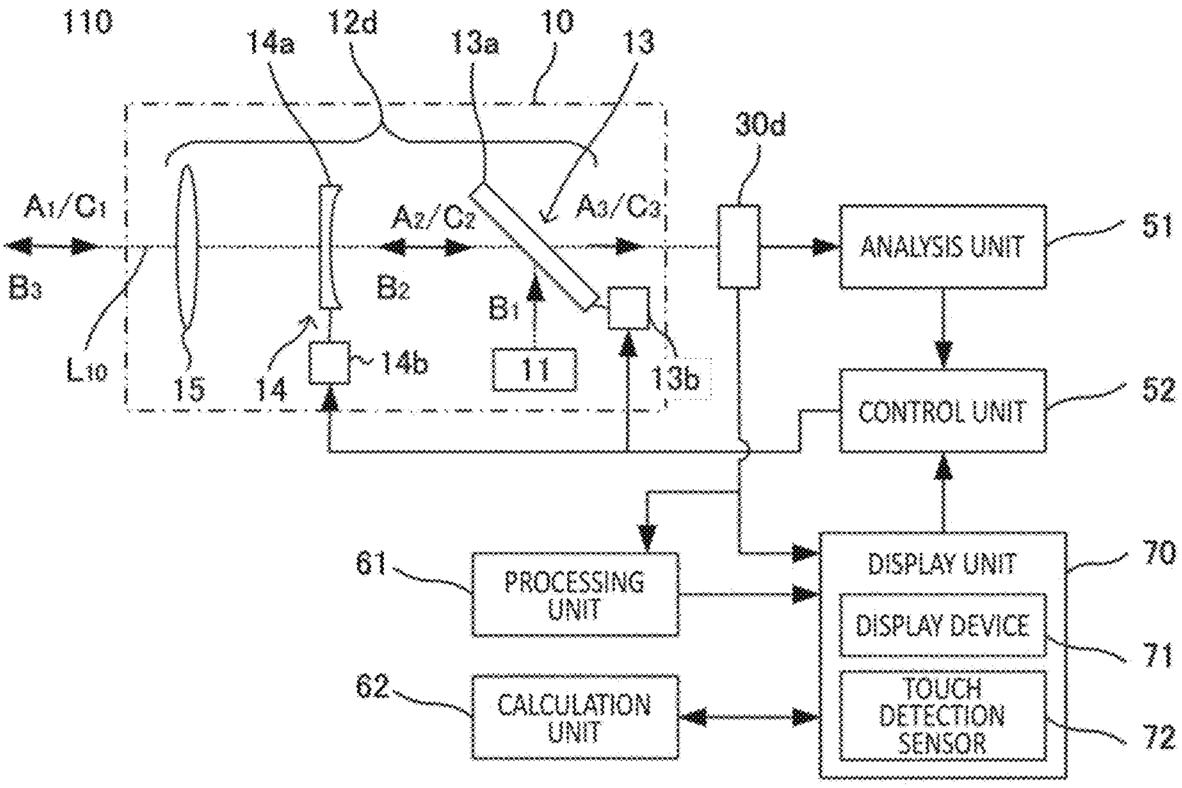
FIG. 9 shows a configuration of a distance measurement apparatus according to a first modification example.

FIG. 9 shows a configuration of a distance measurement apparatus 110 according to a first modification example. The distance measurement apparatus 110 includes the light projection unit 10, an image capture unit 30*d*, the analysis unit 51, the control unit 52, the processing unit 61, the display unit 70, and the calculation unit 62. It should be noted that the units other than the image capture unit 30*d* are configured to be similar to those in the distance measurement apparatus 100 described above.

The image capture unit 30*d* is a unit that captures the image of the target object via the light projection observation optical system 12*d* and that also detects the reflected light (the infrared light) $C_1$ from the target object which is generated by projecting light $B_3$ by the light projection unit 10. It is possible for the image capture unit 30 to adopt an image sensor that has sensitivities for the visible light band and the infrared band, such as the CMOS image sensor. The captured image of the target object which is obtained by receiving the visible light $A_1$ is supplied to the analysis unit 51 and the display unit 70. The detection signal of the reflected light (the infrared light) $C_3$ from the target object which is derived from the light $B_3$ is converted into the digital signal to be supplied to the processing unit 61.

The processing unit 61 determines the distance to the target object based on the detection result of the reflected light (the infrared light) $C_3$ by the image capture unit 30*d*. The details are as described above.

With the distance measurement apparatus 110 having the configuration as described above, the configuration is made for the image capture unit 30 to capture the image of the target object, and also to detect the reflected light $C_1$ from the target object which is generated by projecting the light $B_3$, and the functions of the image capture and the detection can be commonly applied, and thus it is possible to achieve a cost reduction.

It should be noted that in the distance measurement apparatus 100 described above, the configuration in which the light projection unit 10 and the image capture unit 30 share one optical system (the light projection observation optical system 12), is adopted; however, instead of this, a configuration in which each of the image capture unit 30 and the light projection unit 10 has an independent optical system, may be adopted.

Figure 10:
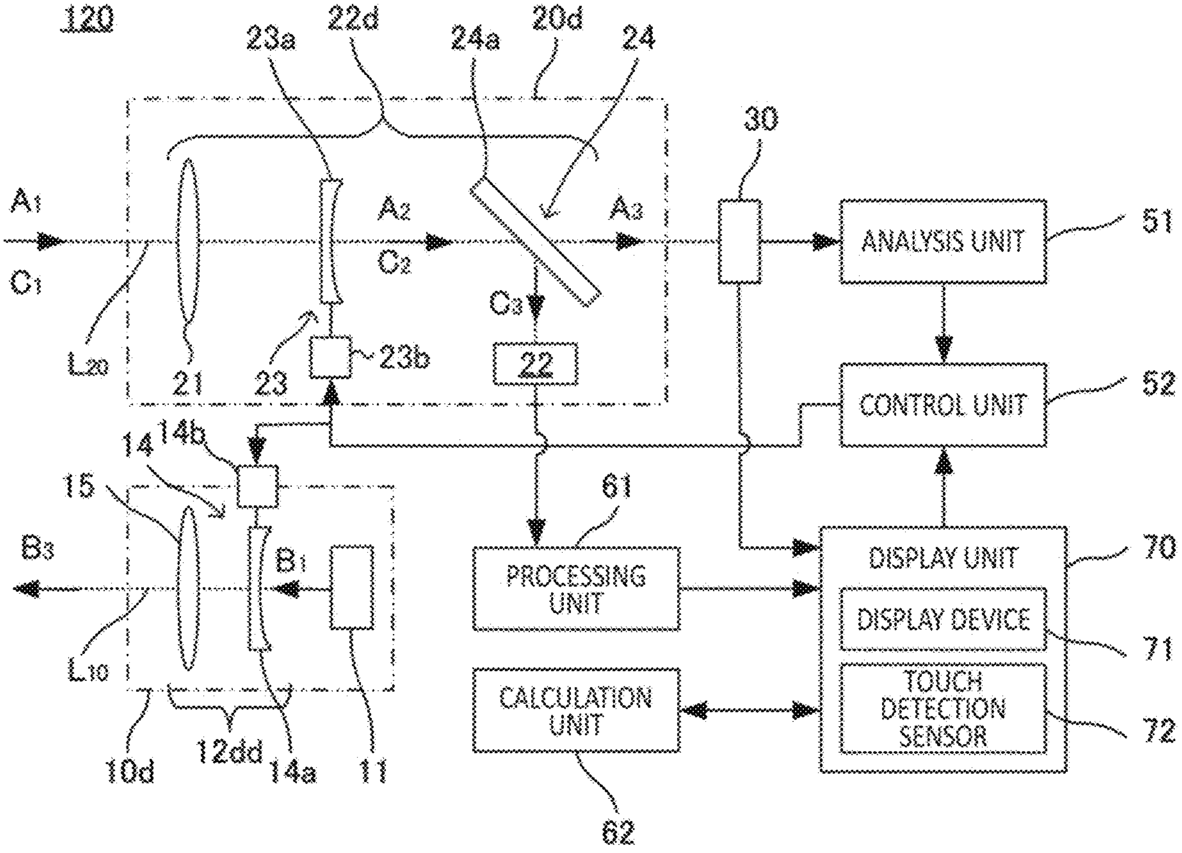
FIG. 10 shows a configuration of a distance measurement apparatus according to a second modification example.

FIG. 10 shows a configuration of a distance measurement apparatus 120 according to a second modification example. The distance measurement apparatus 120 includes a light projection unit 10*d*, a detection unit 20*d*, the image capture unit 30, the analysis unit 51, the control unit 52, the processing unit 61, the display unit 70, and the calculation unit 62. It should be noted that the units other than the light projection unit 10*d* and the detection unit 20*d* are configured to be similar to those in the distance measurement apparatus 100 described above.

The light projection unit 10*d* is a unit that projects the light $B_3$ onto the target object via a light projection optical system (an example of a first optical system) 12*dd*. The light projection unit 10*d* includes the light source 11 and the light projection optical system 12*dd*.

As described above, the light source 11 generates the light $B_1$ with a pulse shape at a constant cycle, and causes the light $B_1$ to enter the light projection optical system 12*dd*.

The light projection optical system 12*dd* is an optical system constituted by a plurality of optical elements that form and direct the light $B_1$, and includes the correction lens 14, and the objective lens 15 as examples. These optical elements are arrayed along the reference axis $L_{10}$ of the light projection optical system 12*dd*.

The correction lens 14 is a lens device that deflects the light $B_1$, and has the lens element 14*a* and the drive device 14*b*. These configurations are as described above.

The objective lens 15 is an optical element that: collimates the light $B_1$ which is output from the light source 11 and enters via the correction lens 14; and sends the collimated light $B_1$ to the front direction of the distance measurement apparatus 100 as the light $B_3$. The configuration of the objective lens 15 is as described above.

The detection unit 20*d* is a unit that detects the reflected light $C_1$ from the target object which is generated by projecting the light $B_3$, via a detection observation optical system (an example of a second optical system) 22*d*. The detection unit 20 includes the light receiving lens 21, a correction lens 23, a mirror 24, and the detection element 22.

The light receiving lens 21 is an optical element that collects the reflected light $C_1$ from the target object. The reflected light $C_1$ collected by the light receiving lens 21 is sent to the correction lens 23.

The correction lens 23 is a lens device that changes a light receiving angle of the reflected light $C_2$, and has a lens element 23*a* and a drive device 23*b*. The lens element 23*a* is an internal focus lens as an example, and is arranged on the reference axis $L_{20}$ between the light receiving lens 21 and the mirror 24. The drive device 23*b* has, for example, a drive element such as a voice coil motor or a piezoelectric motor, and is controlled by the control unit 52 based on a detection result of displacement of the lens element 23*a* by a displacement sensor (not shown) or the like, and displaces the lens element 23*a* in a direction intersecting the reference axis $L_{20}$ (in the present embodiment, two axis directions orthogonal to each other in a plane orthogonal to the reference axis $L_{20}$).

The mirror 24 is a mirror device which reflects the light or through which the light is transmitted according to a wavelength thereof, and has a dichroic reflection surface 24*a*. The dichroic reflection surface 24*a* is a mirror element which reflects the light in an infrared band and through which the light in a visible light band is transmitted. The dichroic reflection surface 24*a* is arranged on the reference axis $L_{20}$; reflects the reflected light $C_2$ to send the reflected light $C_2$ to the detection element 22; causes visible light $A_2$ which enters, together with the reflected light $C_1$, from the front direction of the distance measurement apparatus 100 via the light receiving lens 21 and the correction lens 14, to be transmitted; and sends out the visible light $A_2$ toward the image capture unit 30 that is arranged in the rear.

The detection element 22 is an element that receives the reflected light $C_3$, and outputs the detection signal corresponding to the intensity thereof. The detection element 22 has the configuration as described above. The detection signal is converted into a digital signal, and is supplied to the processing unit 61.

In the distance measurement apparatus 120 having the configuration as described above, the image capture unit 30 captures the image of the target object by receiving the visible light $A_3$ via the detection observation optical system 22*d*. The analysis unit 51 analyzes the image of the target object obtained by the image capture unit 30, and identifies the target object in the captured image. The details of the analysis of the captured image are as described above. The control unit 52 controls the correction lens 14 that is included in the light projection optical system 12*dd* and the correction lens 23 that is included in the detection observation optical system 22*d*, based on the analysis result by the analysis unit 51.

Figure 11:
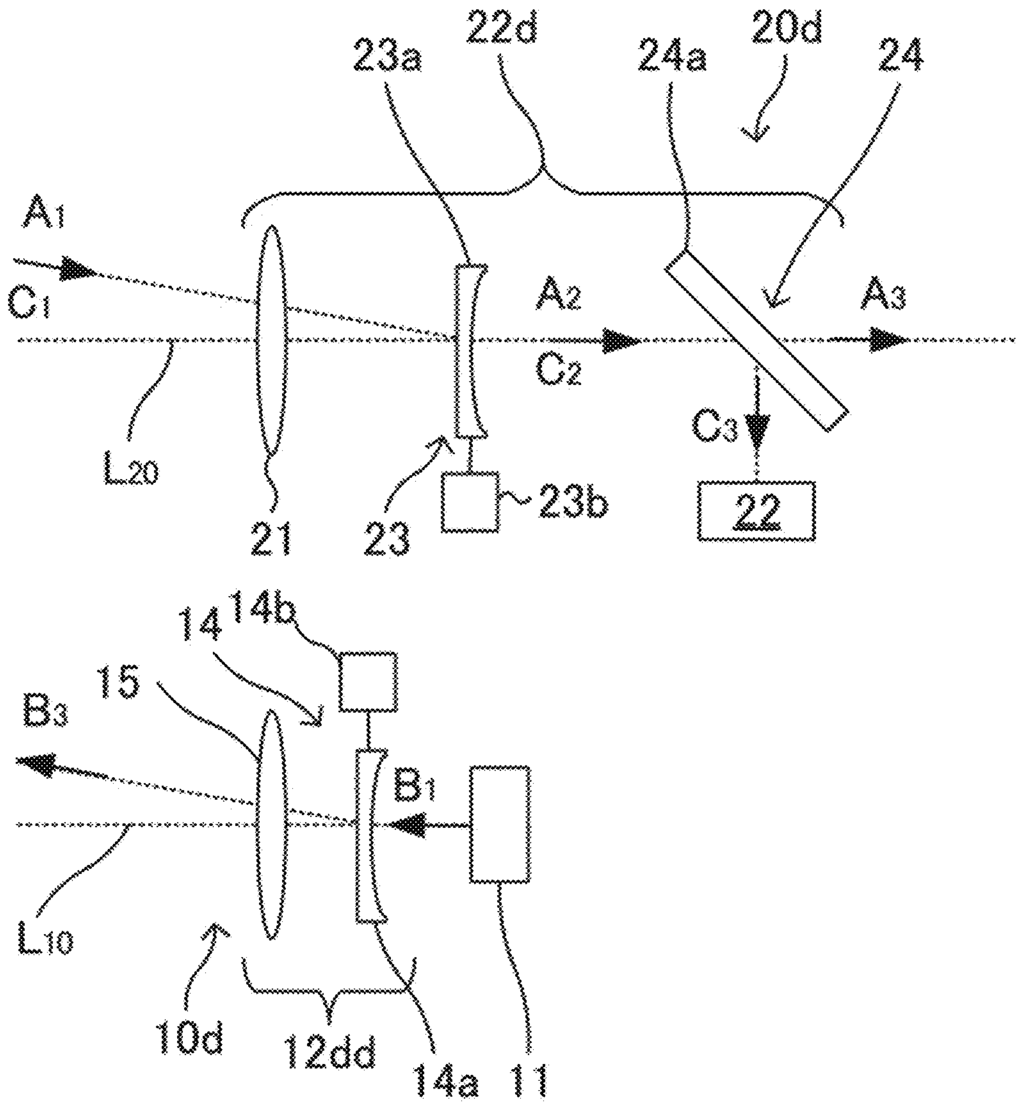
FIG. 11 shows an example of a control of the correction lens.

FIG. 11 shows examples of controls of the correction lenses 14, 23. When the deviation S (the center coordinates of the target object with respect to the center coordinates at the center of the image in the display screen 71*a*) of the target object with respect to the center of the image (the reference axis $L_{10}$), is detected by the analysis unit 51, the control unit 52 displaces the lens element 14*a* with respect to the reference axis $L_{10}$ by the drive device 14*b*. In this manner, the light $B_3$ is deflected (tilted with respect to the reference axis $L_{10}$). At the same time as this, the control unit 52 displaces the lens element 23*a* with respect to the reference axis $L_{20}$ by the drive device 23*b*. In this manner, the light receiving angle of the reflected light $C_1$ (and the visible light $A_1$) is tilted with respect to the reference axis $L_{20}$. In this context, the deflection angle of the light $B_3$ and the light receiving angle of the reflected light $C_1$ (and the visible light $A_1$) are equally controlled for the displacement. Accordingly, it is possible to radiate the light $B_3$ to the target object, and also to receive the reflected light $C_1$ which is generated from the target object by radiating the light $B_3$. In addition, with the present embodiment, it is possible to perform, at the same time, the control of the deflection angle of the light $B_3$, and the control of the light receiving angle of the reflected light $C_1$ (and the visible light $A_1$), and thus it is possible to shorten the processing time.

In addition, as described above, the control unit 52 controls the detection observation optical system 22*d*, so that the image of the target object analyzed by the analysis unit 51 is captured at the center of the image capture region of the image capture unit 30. By the image of the target object being captured at the center of the image capture region in this way, the detection precision is enhanced.

It should be noted that the correction lenses 14, 23 may be a vari-angle prism that is controlled by the control unit 52 and deforms asymmetrically with respect to the central axis.

It should be noted that the distance measurement apparatus 120 according to the second modification example adopts the configuration in which the image of the target object is captured by the image capture unit 30, and the reflected light $C_1$ from the target object which is generated by projecting the light $B_3$ is detected by the detection unit 22; however, instead of this, a configuration in which the image capture unit 30 captures the image of the target object, and also detects the reflected light $C_1$ from the target object which is generated by projecting the light $B_3$, may be adopted. In addition, the correction lenses 14, 23 may be used to control a shake correction of the apparatus body. In addition, the target object may be controlled to be positioned at the center of the image by shifting the image capture unit 30, by using the drive device (not shown), in a plane orthogonal to the reference axis $L_{10}$.

While the present invention has been described by way of the embodiments, the technical scope of the present invention is not limited to the above described embodiments. It is apparent to persons skilled in the art that various alterations or improvements can be made to the above described embodiments. It is also apparent from the description of the claims that embodiments added with such alterations or improvements can be included in the technical scope of the present invention.

The operations, procedures, steps, and stages of each process performed by an apparatus, system, program, and method illustrated in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

EXPLANATION OF REFERENCES

10: light projection unit; 10*d*: light projection unit; 11: light source; 12, 12*d*: light projection observation optical system; 12*dd*: light projection optical system; 13: mirror; 13*a*: dichroic reflection surface; 13*b*: drive device; 14: correction lens; 14*a*: lens element; 14*b*: drive device; 15: objective lens; 20, 20*d*: detection unit; 21: light receiving lens; 22: detection element; 22*d*: detection observation optical system; 23: correction lens; 23*a*: lens element; 23*b*: drive device; 24: mirror; 24*a*: dichroic reflection surface; 30, 30*d*: image capture unit; 51: analysis unit; 52: control unit; 61: processing unit; 62: calculation unit; 70: display unit; 71: display device; 71*a*: display screen; 72: touch detection sensor; 100, 110, 120: distance measurement apparatus; 200: captured image; 201: cup; 202: pin flag; 210: green; 220: bunker; 230: woods; 240, 242, 246: mark; 244: area; $A_1$, $A_2$, $A_3$: visible light; $B_2$, $B_2$, $B_3$: light; $C_1$, $C_2$, $C_3$: reflected light; $L_{10}$, $L_{20}$: reference axis.

What is claimed is:

1. A distance measurement apparatus that projects light to measure a distance to a target object, the distance measurement apparatus comprising:
- an image capture unit that captures an image of the target object via an image capturing optical system;
- an analysis unit that detects, based on an image capture result obtained by the image capture unit, a deviation of the target object with respect to a reference axis of a first optical system used to project the light;
- a control unit that displaces a lens element or tilts a mirror element, each of which is included in the first optical system, to deflect the light in a direction determined from a detection result of the deviation of the target object;
- a light projection unit that projects the light onto the target object via the first optical system; and
- a processing unit that determines the distance to the target object based on a detection result of reflected light obtained via a second optical system, the reflected light being generated by projecting the light onto the target object by the light projection unit wherein
- the image capturing optical system shares at least a part of the first optical system or the second optical system.

2. The distance measurement apparatus according to claim 1, wherein the light projection unit includes a light source unit that emits the light, and the control unit controls any one of the light source unit and the first optical system to control a projection state of the light.

3. The distance measurement apparatus according to claim 1, wherein a projection state of the light includes any one of a radiation direction of the light and an intensity of the light.

4. The distance measurement apparatus according to claim 1, wherein
- the analysis unit analyzes the image of the target object in the image capture result to identify the target object.

5. The distance measurement apparatus according to claim 4, wherein
- the analysis unit analyzes the image of the target object based on a machine learning model, and
- the machine learning model is constructed by machine learning in advance by setting, as training data, an image of a target object that is a target to which a distance is measured.

6. The distance measurement apparatus according to claim 4, wherein
- the analysis unit analyzes the image of the target object by an image processing method, and
- the image processing method includes at least an edge detection method.

7. The distance measurement apparatus according to claim 4, wherein
- the control unit controls any one of the first optical system, the image capturing optical system, and the image capture unit such that the image of the target object analyzed by the analysis unit is captured at a center of an image capture region of the image capture unit, and
- the analysis unit identifies the target object at a center of the image.

8. The distance measurement apparatus according to claim 4, wherein
- the image of the target object includes a plurality of images, and the image capture unit captures the plurality of images of the target object at different timings, and
- the analysis unit identifies the target object from an image difference between the plurality of images.

9. The distance measurement apparatus according to claim 4, wherein
- the analysis unit detects resolution of the image, and
- the control unit controls the first optical system based on a detection result of the resolution, to enlarge or reduce the image of the target object.

10. The distance measurement apparatus according to claim 4, wherein
- the analysis unit analyzes the image of the target object to identify a center or a center of gravity of the target object, and
- the control unit controls any one of the light projection unit and the first optical system to project the light onto the identified center or the identified center of gravity of the target object.

11. The distance measurement apparatus according to claim 4, wherein
- the analysis unit analyzes the image of the target object to identify the target object,
- the control unit controls the light to scan the identified target object by using the light, and
- the processing unit determines the distance to the target object based on a relationship between a scan position of the target object scanned by the light and the detection result of the reflected light.

12. The distance measurement apparatus according to claim 1, further comprising a display unit that displays, on a display screen, the image of the target object obtained by the image capture unit.

13. The distance measurement apparatus according to claim 12, wherein the display unit displays an object to be superimposed on the image of the target object, the object indicating a location on the target object onto which the light is projected, or the target object to which the distance is determined.

14. The distance measurement apparatus according to claim 12, wherein the display unit displays the image of the target object obtained by the image capture unit such that a location on the target object onto which the light is projected is positioned at a center of a screen.

15. The distance measurement apparatus according to claim 12, wherein the display screen includes a touch detection sensor that detects a touch operation by a user, and when at least one location included in the image is selected by the touch operation on the display screen, the control unit controls the light to project the light onto the at least one location.

16. The distance measurement apparatus according to claim 15, further comprising a calculation unit that calculates, when a plurality of locations which are included in the image are selected by touch operations on the display screen, distances to the plurality of locations, or a distance and/or an area between the plurality of locations.

17. The distance measurement apparatus according to claim 1, wherein the first optical system includes at least one optical element for a correction among the lens element, a prism, or the mirror element, and the control unit drives the at least one optical element for the correction.

18. A distance measurement method for projecting light to measure a distance to a target object, the distance measurement method comprising:

capturing an image of the target object via an image capturing optical system;

detecting, based on an image capture result obtained in the capturing, a deviation of the target object with respect to a reference axis of a first optical system used to project the light;

displacing a lens element or tilting a mirror element, each of which is included in the first optical system, to deflect the light in a direction determined from a detection result of the deviation of the target object;

projecting the light onto the target object via the first optical system; and determining the distance to the target object based on a detection result of reflected light obtained via a second optical system, the reflected light being generated by projecting the light onto the target object in the projecting, wherein the image capturing optical system shares at least a part of the first optical system of the second optical system.

* * * * *